UNITED STATES PATENT OFFICE.

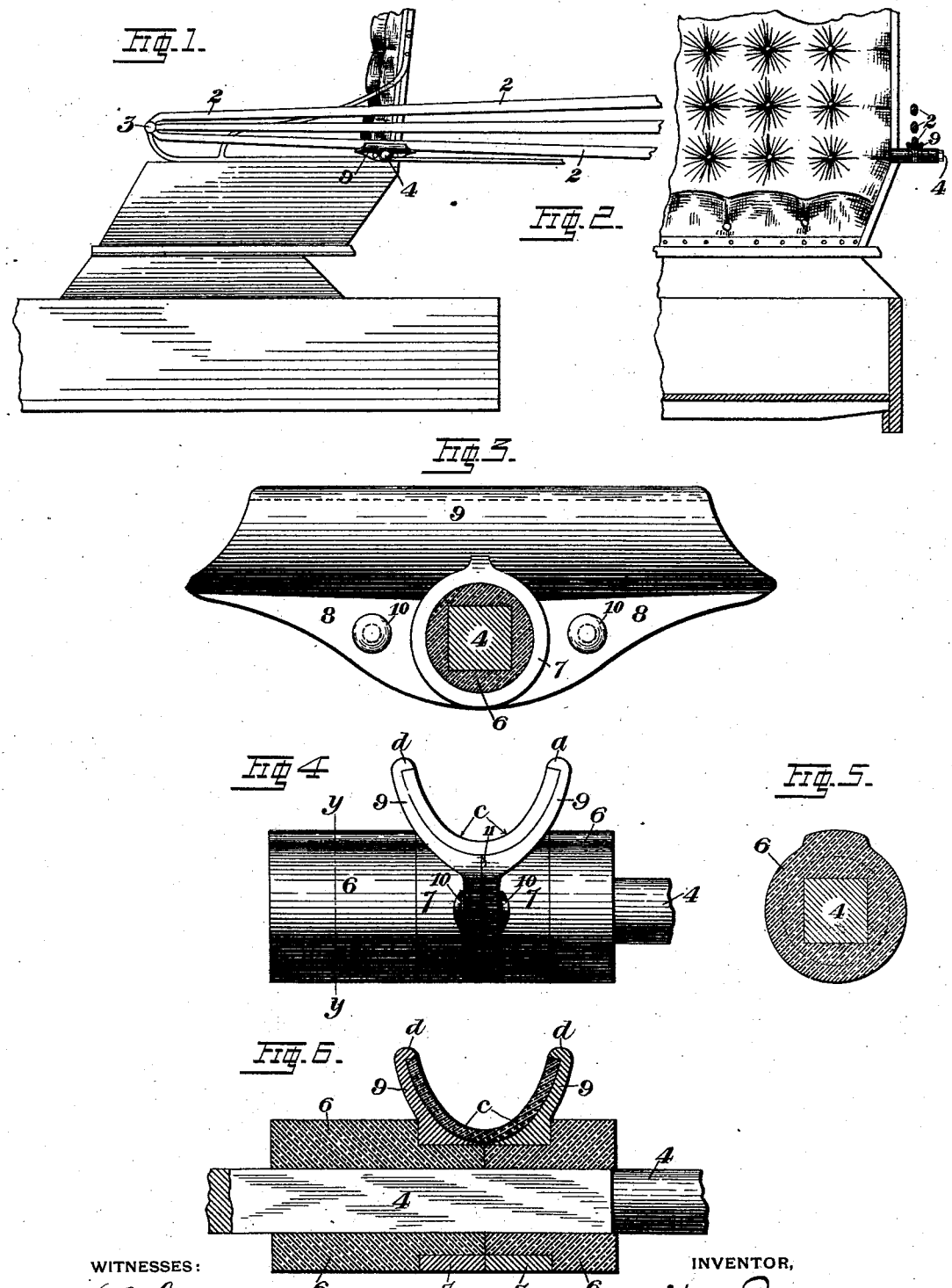

HENRY REUCK, OF PITTSBURG, PENNSYLVANIA.

BUGGY-BOW REST.

SPECIFICATION forming part of Letters Patent No. 367,064, dated July 26, 1887.

Application filed March 28, 1887. Serial No. 232,688. (No model.)

*To all whom it may concern:*

Be it known that I, HENRY REUCK, of Pittsburg, in the county of Allegheny and State of Pennsylvania, have invented a new and useful Improvement in Rests for Buggy-Bows; and I do hereby declare the following to be a full, clear, and exact description thereof, reference being had to the accompanying drawings, forming part of this specification, in which—

Figure 1 is a side view of part of a buggy body and top, showing my improved bow-rest. Fig. 2 is a front view thereof, the buggy-bows being in section on the line $x$ $x$ of Fig. 1. Fig. 3 is an enlarged side view of the bow-rests. Fig. 4 is an end view thereof. Fig. 5 is a view of the gum washer, being a section on the line $y$ $y$ of Fig. 4. Fig. 6 is a transverse central section of the bow-rest.

Like symbols of reference indicate like parts in each.

In the drawings, 2 represents the buggy-bows, which are pivoted in the usual manner at their lower ends on a pin or bolt, 3.

4 is the bolt forming the pivot of the lower end of the joint. On the inner side of the joint the bolt 4 is squared, and fitting around it are rubber tubes or cylinders 6, having eyes squared to fit around the bolt. At the inner ends of the tubes 6 they are contracted in diameter for the reception of the bow-rest socket. The rest is preferably made in two longitudinally-divided parts having hollow cylindrical sockets 7. These sockets have plain-faced lateral flanges 8, and are surmounted by flared parts 9, each shaped in the form of a quarter-cylinder. The parts of the rest are placed together, as shown in Figs. 4 and 6, and then the parts 9 form a trough-shaped semi-cylindrical rest which extends transversely to the bolt 4. The parts of the rest are held together by bolts or rivets 10, which connect the flanges 8, and by projections 11 on one flange fitting in sockets in the other flange. The sockets are clamped firmly between the rubber tubes. The inside of the trough of the rest has a soft lining, $c$, preferably constituted by a strip of rubber or other flexible material bowed into the proper shape and held in place by flanges $d$ at the upper edges of the trough.

When thus constructed, the buggy-bow lies in the trough of the rest when the top is down, and by reason of its projection on both sides of the bolt 4 it affords an extended and secure support for the bow. The concave shape of the rest prevents lateral displacement of the bow, and the soft lining $c$ prevents abrasion of the bow or rest. The rest-sockets 7 are turned on their rubber bearings to the desired angle, and the rubber tubes are then tightened up to clamp the sockets between them. The rubber then allows the rest to have a slight yielding rocking motion, so as to adapt itself to the position of the bow.

The parts may be constructed of any suitable material, and may be changed in shape and details of construction. For example, the parts $a$ and $b$ and the sockets 7 may all be cast in one piece of metal, instead of being made in two pieces, as I have shown.

My invention consists in the rubber lining between which the socket of the rest is clamped and on which it is mounted, and in the division of the socket and rest into two longitudinally-divided parts. The other features of the device I do not claim.

I claim—

1. A buggy-bow rest having a bolting-socket, in combination with a bolt whereon the socket is mounted, and a rubber bearing fixed on the bolt and fitting within the socket, substantially as and for the purposes described.

2. A buggy-bow rest having a bolting-socket, in combination with a bolt whereon the socket is mounted, and rubber tubes 6 on the bolt inside the socket and clamping the sides thereof, substantially as and for the purposes described.

3. The buggy-bow rest of concave form, and consisting of two longitudinally-divided parts having sockets and bolting-flanges, substantially as and for the purposes described.

4. A buggy-bow rest made in concave form and having a socket, in combination with a bolt whereon said socket is mounted, said rest projecting to each side of the bolt and socket, substantially as and for the purposes described.

In testimony whereof I have hereunto set my hand this 23d day of March, A. D. 1887.

HENRY REUCK.

Witnesses:
W. B. CORWIN,
THOMAS W. BAKEWELL.